US011015697B2

(12) United States Patent
Mariotti et al.

(10) Patent No.: US 11,015,697 B2
(45) Date of Patent: May 25, 2021

(54) CONTINUOUSLY VARIABLE TRANSMISSION DEVICE WITH GEAR REGULATION DEVICE

(71) Applicant: PIAGGIO & C. S.p.A., Pisa (IT)

(72) Inventors: Walter Mariotti, Pisa (IT); Giacomo Freschi, Pisa (IT); Paolo Nesti, Pisa (IT)

(73) Assignee: PIAGGIO & C. S.P.A., Pisa (IT)

( * ) Notice: Subject to any disclaimer, the term of this patent is extended or adjusted under 35 U.S.C. 154(b) by 269 days.

(21) Appl. No.: 15/781,897

(22) PCT Filed: Dec. 1, 2016

(86) PCT No.: PCT/IB2016/057251
§ 371 (c)(1),
(2) Date: Jun. 6, 2018

(87) PCT Pub. No.: WO2017/098378
PCT Pub. Date: Jun. 15, 2017

(65) Prior Publication Data
US 2018/0355966 A1    Dec. 13, 2018

(30) Foreign Application Priority Data

Dec. 10, 2015  (IT) ........................ 102015000081834

(51) Int. Cl.
*F16H 55/56* (2006.01)
*F16H 9/18* (2006.01)
*F16H 9/12* (2006.01)

(52) U.S. Cl.
CPC .......... *F16H 55/563* (2013.01); *F16H 9/125* (2013.01); *F16H 9/18* (2013.01)

(58) Field of Classification Search
CPC .......... F16H 55/563; F16H 9/125; F16H 9/18; F01D 1/34
USPC ..................................................... 474/13, 14
See application file for complete search history.

(56) References Cited

U.S. PATENT DOCUMENTS

| 5,326,330 | A | * | 7/1994 | Bostelmann | .......... F16H 55/563 474/13 |
| 5,421,784 | A | * | 6/1995 | Robert | .................. F16H 55/563 474/13 |
| 6,309,317 | B1 | * | 10/2001 | Joss | ........................ F16D 43/06 474/13 |

(Continued)

FOREIGN PATENT DOCUMENTS

WO      20120129417      9/2012

OTHER PUBLICATIONS

International Search Report, PCT Application No. PCT/IB2016/057251, European Patent Office, Authorized Officer, Vasilis Hassiotis, dated Feb. 10, 2017, 10 pages.

*Primary Examiner* — Michael R Mansen
*Assistant Examiner* — Mark K Buse
(74) *Attorney, Agent, or Firm* — Cantor Colburn LLP (57) ABSTRACT

A continuously variable transmission device (1) for a two-, three- or four-wheel motorcycle comprises a gear shift regulation device provided with a slide (40) axially slidable and suitable to engage special rollers (18) to hold them during the gear shift. A mobile bushing (9) is suitable to influence the slide (40) to cause its translation from a rearward position to a forward limit position to engage the special rollers (18).

12 Claims, 8 Drawing Sheets

(56) References Cited

U.S. PATENT DOCUMENTS

| | | | |
|---|---|---|---|
| 6,520,878 B1* | 2/2003 | Leclair | F16H 55/563 |
| | | | 474/12 |
| 2004/0214668 A1* | 10/2004 | Takano | F16H 55/563 |
| | | | 474/14 |
| 2005/0064968 A1* | 3/2005 | Robert | F16H 61/66245 |
| | | | 474/13 |
| 2006/0258492 A1* | 11/2006 | Wu | F16H 55/563 |
| | | | 474/13 |
| 2007/0004543 A1 | 1/2007 | Ishida | |
| 2007/0105670 A1* | 5/2007 | Oishi | F16H 63/067 |
| | | | 474/8 |
| 2008/0047772 A1* | 2/2008 | Ishida | F16H 55/563 |
| | | | 180/366 |
| 2009/0227404 A1* | 9/2009 | Beyer | F16H 63/067 |
| | | | 474/14 |
| 2014/0004984 A1* | 1/2014 | Aitcin | F16H 63/067 |
| | | | 474/14 |
| 2014/0335981 A1 | 11/2014 | Kadokawa | |
| 2014/0349792 A1* | 11/2014 | Aitcin | F16H 63/067 |
| | | | 474/13 |
| 2020/0166115 A1* | 5/2020 | Aitcin | B62M 11/12 |

* cited by examiner

CONTINUOUSLY VARIABLE TRANSMISSION DEVICE WITH GEAR REGULATION DEVICE

CROSS-REFERENCE TO RELATED APPLICATION

This application is the 35 U.S.C. § 371 national stage application of PCT Application No. PCT/IB2016/057251, filed Dec. 1, 2016, where the PCT claims the priority to and benefit of Italian Patent Application No. 102015000081834 filed Dec. 10, 2015, both of which are herein incorporated by reference in their entireties.

The present invention relates to a transmission system, in particular a continuously variable transmission system for motorcycles, provided with a regulation device of the gear shift curve.

In this document the term "motorcycle" means a vehicle with two, three or four wheels, pivoting or non pivoting, such as the Vespa®, Ape® or MP3® vehicles marketed by the Applicant.

The Continuously Variable Transmission (CVT) is a type of automatic transmission for vehicles in which the transmission ratio can vary continuously between two limit values. The continuous transmission is widely used in two-wheeled vehicles with a small and medium engine size, in particular motor scooters.

In a CVT, the variation of the transmission ratio takes place by varying the winding diameter of the belt on two pulleys, one of which is the drive pulley and the other driven, and at least one of these has the ability to draw together and distance the two parts or half-pulleys which it is composed of.

Typically, the drive pulley comprises a speed controller made with centrifugal masses, generically referred to as "rollers", which have the task of performing the axial drawing together of the respective half-pulleys, passing from the low gear condition (half-pulleys distant) to the high gear condition (half-pulleys juxtaposed).

Devices are known of for regulating the gear shift curve, which, when the CVT is in the low gear condition, allow blocking of some of the rollers, thus preventing them from participating in the juxtaposition of the half-pulleys. Said half-pulleys thus reach a predefined axial distance at a greater number of engine revolutions, giving the CVT a more sporting set-up.

Conversely, if all the rollers participate in the juxtaposition of the half-pulleys, these find themselves at said axial distance at a lower number of engine revolutions, giving the CVT a more touring set-up.

An example of embodiment of such a device for the adjustment of the gear shift curve is described in the document WO-A1-2013/098689 in the name of the Applicant.

However, such a regulation device has the drawback of allowing activation and deactivation only in the presence of the low gear condition, i.e. when the rollers are next to the drive shaft, to avoid impact due to the sudden release of the rollers in the gear shift phase.

The object of the present invention is to provide a transmission device which satisfies the needs mentioned above and which at the same time overcomes the drawbacks of the prior art.

Such purpose is achieved by a transmission device made according to claim 1. The dependent claims describe embodiment variants.

The features and advantages of the transmission device will be evident from the description given below, by way of a non-limiting example, according to the appended drawings, wherein.

With reference to the appended drawings, reference numeral 1 globally denotes a continuously variable transmission device, configured to be applied preferably to a two/three-wheel motorcycle, engaged with a drive shaft 2 which defines an axis of rotation X.

The transmission device 1 comprises a first drive pulley 4, driven in rotation by the drive shaft 2, and a second driven pulley (not shown), connected to each other by a V-belt 6.

The drive pulley 4 is composed of a first half-pulley 8 and a second half-pulley 10, respectively provided with facing, truncated-cone active surfaces 8*a*, 10*a*, sliding along said axis of rotation X so as to juxtapose and distance the active surfaces 8*a*, 10*a*, and integral with each other in rotation.

The first half-pulley 8 comprises in particular a mobile bushing 9, which carries the active surface 8*a* and provides a bushing 8*b* coaxial to the drive shaft 2, and a speed controller 12 comprising a container 14, supported by the mobile bushing 9 and provided with a shaped seat 16, and a plurality of rollers, both basic rollers and special rollers 18, housed in the seat 16.

The special rollers 18 are provided with engagement means adapted to be held by counter-engagement means of the transmission device.

The rollers realize centrifugal masses which, as the number of engine revolutions increases, push the first half-pulley 8, and in particular the mobile bushing 9, towards the second half-pulley 10.

This way, the winding diameter of the belt 6 on the drive pulley 4 increases and the belt, not being able to stretch, operates to decrease the winding diameter on the driven pulley, increasing the transmission ratio (high gear).

The transmission device 1 further comprises a gear shift regulation device, able to hold the special rollers 18.

The regulation device comprises an actuating device adapted to place the regulation device in the actuation configuration.

For example, the actuating device comprises an actuating rod 20, for example axially placed inside the drive shaft 2, projecting with a control end 20*a* from the side of the second half-pulley 10 opposite the first half-pulley 8.

The actuating device further comprises an actuating pin 22, for example made in one piece with the actuating rod 20, placed at the end of this opposite the control end 20*a* and provided with a radial recess 24.

The actuating device further comprises a control foot 26 operable, for example in rotation, for example by electric control, to axially push the actuating rod 20.

Moreover, the actuating device comprises an actuation spring 28 placed between the control foot 26 and the actuating pin 22, for example between the control foot 26 and the control end 20*a* of the actuating rod 20 or between the actuating rod 20 and the actuating pin 22 (in the variant with pin separate from the rod).

The actuating device further comprises an abutment element 30, for example a plate, and an abutment spring 32, which operate in contrast to the advancement of the actuating pin 22 to a forward position resulting from actuation of the control foot 26.

The regulation device further comprises a locking device.

Figures 8A, 8B, 8C:
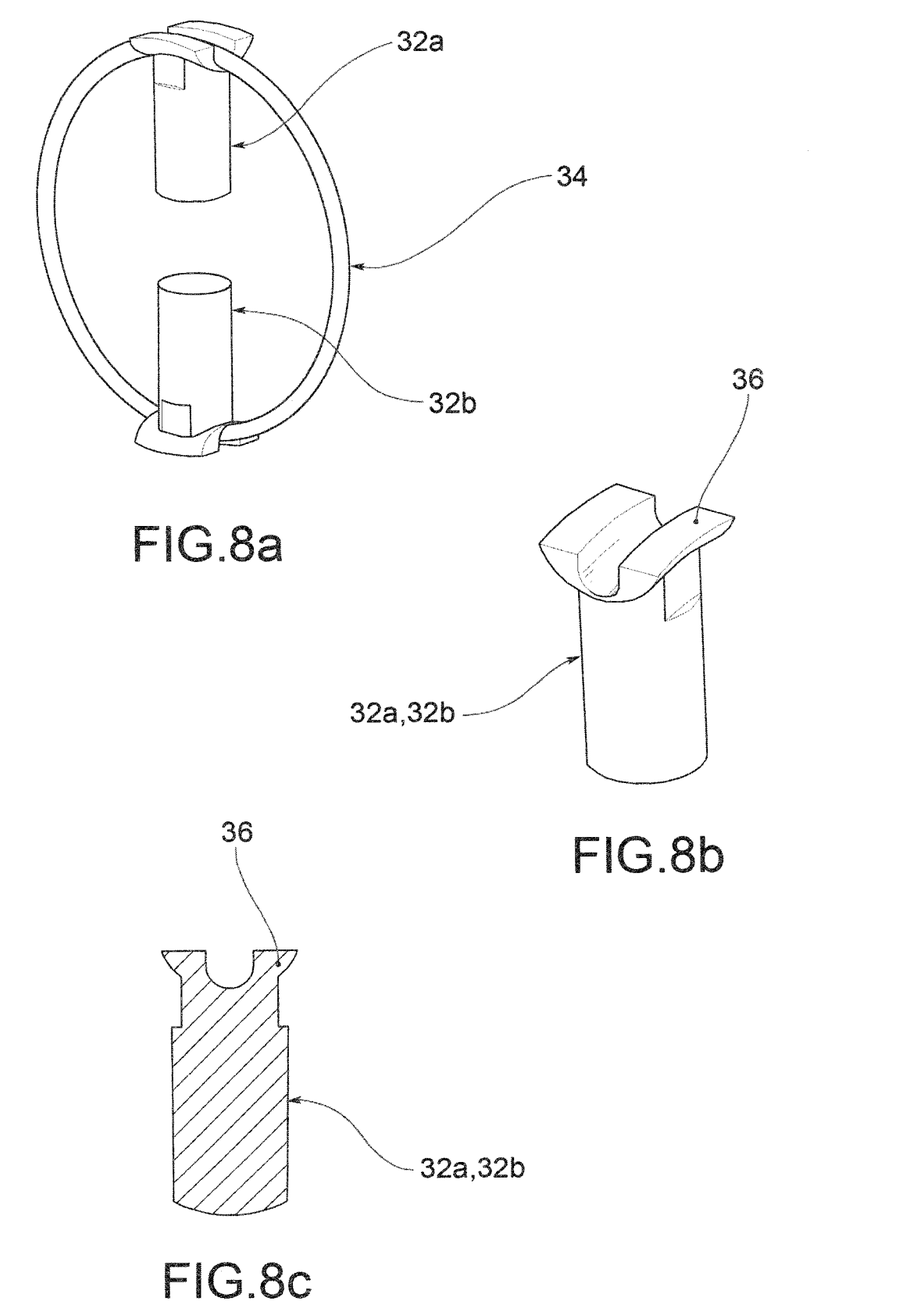
FIG. 8*a* shows a system with keys and return spring of the transmission device according to the present invention.
FIGS. 8*b* and 8*c* show a key of the transmission device according to the present invention.

The locking device comprises a pair of keys 32*a*, 32*b* movable radially between a rearward radial position, next to the axis of rotation X, and a forward radial position; said keys are adapted to engage the actuating pin 22 in the recess 24.

The locking device further comprises at least a return spring 34 operating on the keys 32*a*, 32*b* to bring them into a rearward radial position; said spring is for example realized as a single annular element, arranged around the drive shaft, configured to push the keys 32*a*, 32*b* into the recess 24.

The keys 32*a*, 32*b* are, furthermore, respectively provided with a protrusion 36 suitable to lock the respective key in the forward radial position.

Figure 7A:
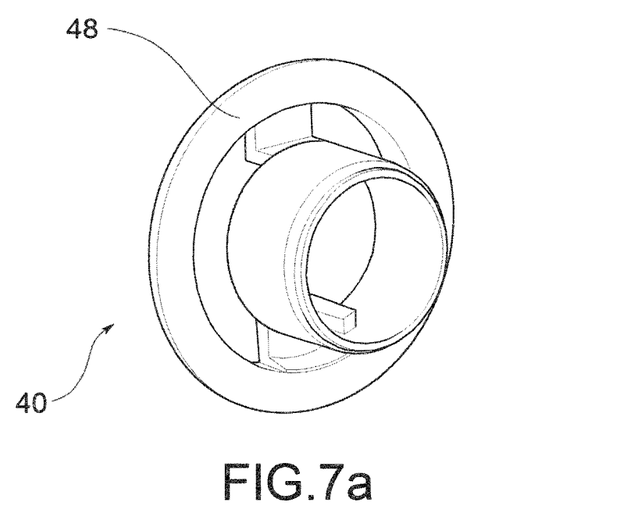
FIGS. 7*a* and 7*b* illustrate a slide of the transmission device according to the present invention.
Figure 7B:
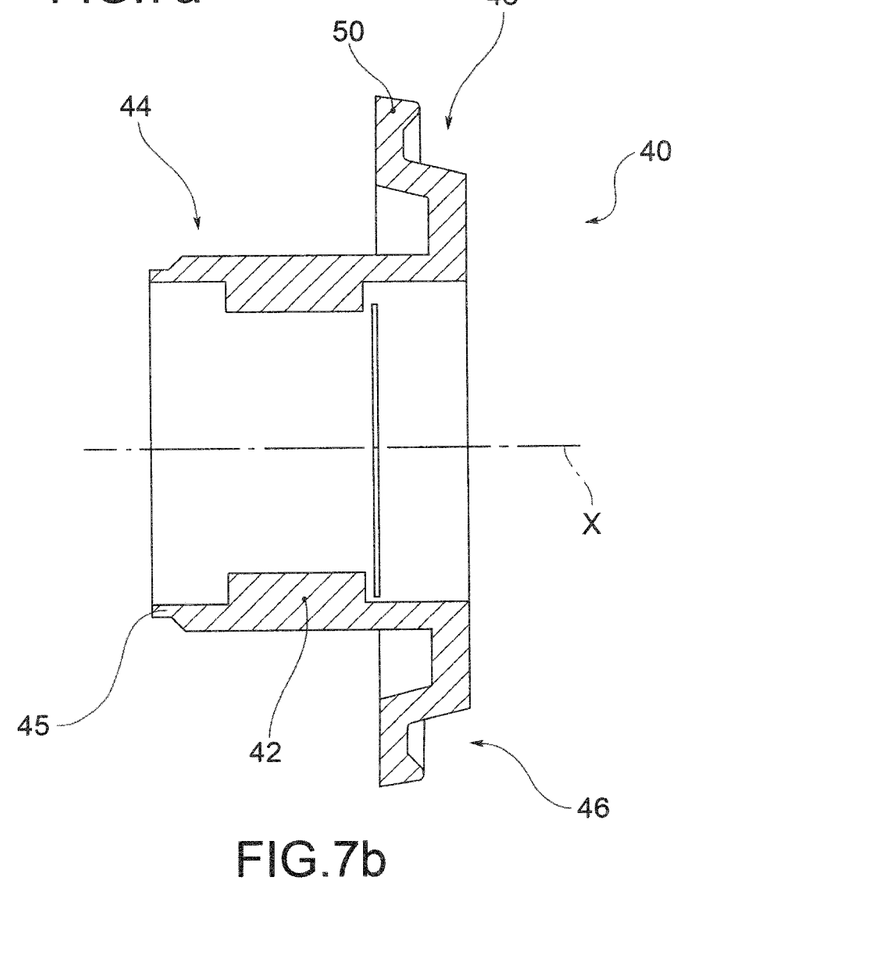

The regulation device further comprises a retention slide 40, sliding on the drive shaft 2 and adapted to cooperate with the locking device of the actuating pin 22, with the special rollers 18 of the speed controller, with the mobile bushing 9 of the first half-pulley 8 and with the abutment element 30 of the actuating device.

In particular, the slide 40 comprises a tubular wall 42 which extends mainly along the rotation axis X, between a locking end 44 and a retention end 46.

At the locking end 44, the tubular wall 42 presents a thinning 4645 adapted to engage the protrusion 36 of the keys 32*a*, 32*b* to lock them in the forward radial position.

At the retention end 46, the slide 40 has an annular flange 48 having a gripping edge 50 to engage the special rollers 18 of the speed controller.

Furthermore, the tubular wall 42 presents, internally, an annular protrusion 52 adapted to cooperate with the abutment element 30 of the actuating device.

Figure 6A:
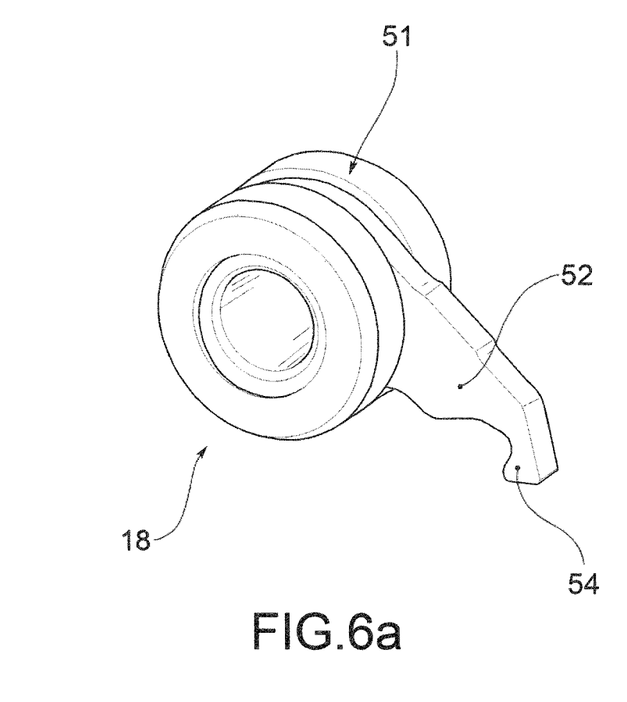
FIGS. 6*a* and 6*b* show a special roller of the transmission device according to the present invention.
Figure 6B:
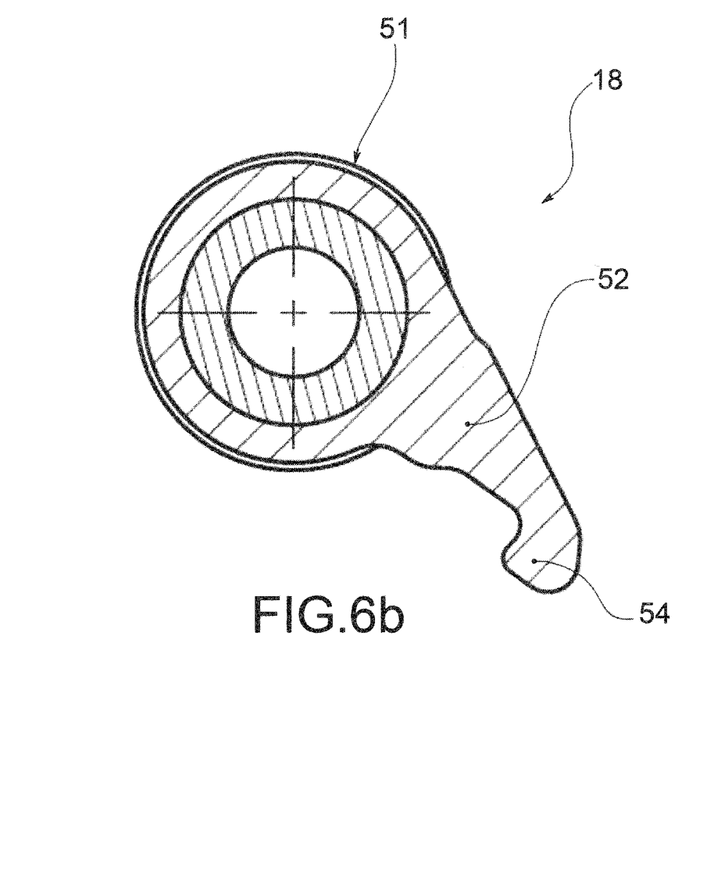

The special roller 18 comprises a rolling body 51, designed to roll on the surface of the seat 16 of the container 14, and a stem 52 extending away from the rolling body 51, ending with an engagement portion 54 suitable to engage with the gripping edge 50 of the slide 40 so as to realize a unilateral radial constraint which prevents the radial outward movement of the special roller 18.

The stem 52 and the engagement portion 54 realize an example of said engagement means, while the gripping edge 50 of the slide 40 realizes an example of said counter-engagement means.

Figure 1:
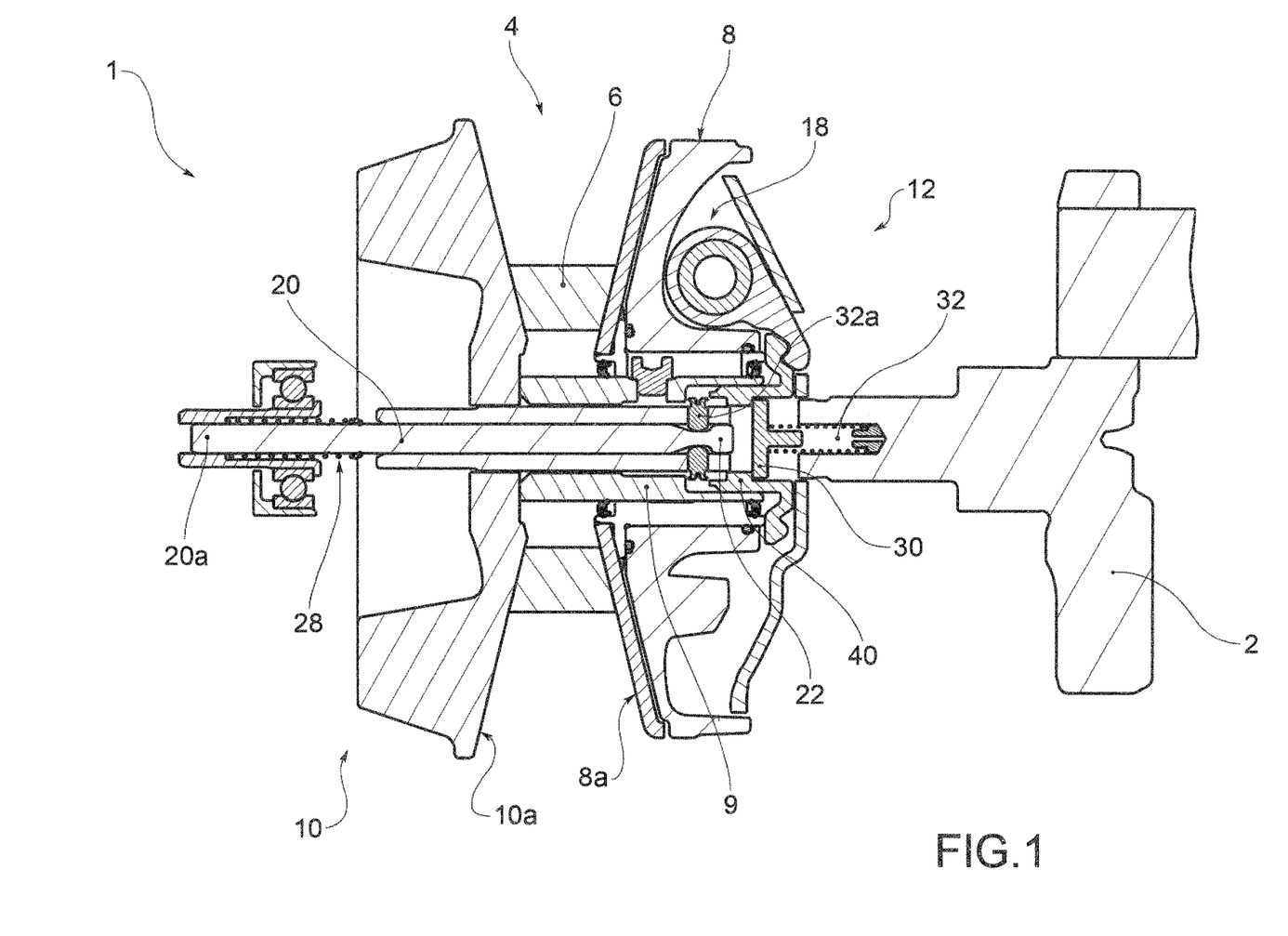
FIG. 1 shows a cross-section of a transmission device according to the present invention, in an initial configuration in low gear, with the regulation device deactivated and not engaged.

During normal operation of the transmission device 1, in an initial or rest configuration, at low engine revolutions, i.e. below a predefined threshold of engine revolutions, the transmission device is in low gear conditions, in which the first half-pulley 8 and the second half-pulley 10 are distant and the V-belt has a reduced winding diameter (FIG. 1).

The rollers, both basic and special 18, on account of the reduced centrifugal force, are in a retracted radial position, i.e. close to the axis of rotation X, and therefore suitable to be engaged by the slide 40.

In such configuration, the regulation device being disabled, the control rod 20 is in a rearward axial position, the keys 32*a*, 32*b* are in a rearward radial position, in which they engage the actuating pin 22 occupying the recess 24, and the slide 40 is in an axial position in which it does not obstruct the outward radial translation of the keys 32*a*, 32*b*.

Figure 2:
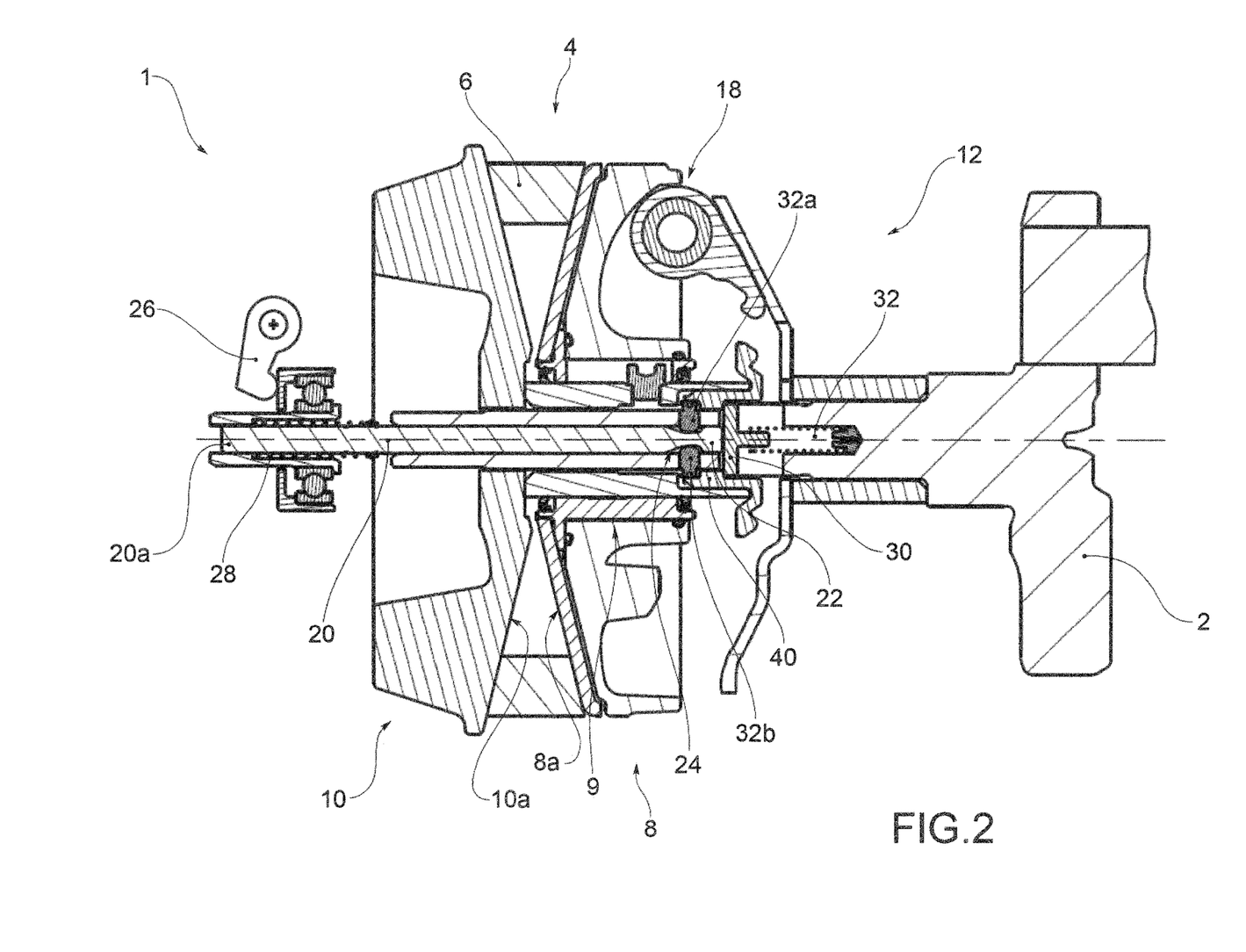
FIG. 2 shows the transmission device in FIG. 1, in a high gear configuration, with the regulation device deactivated and not engaged.

If, starting from this configuration, the engine revolutions increase, the first half-pulley 8 approaches the second half-pulley 10, so that the mobile bushing 9 leaves the slide 40 free to move into a rearward position, under the action of the abutment element 30 and of the return spring 32, in which it is not able to engage the special rollers 18, which move into a forward radial position, i.e. distant from the rotation axis X (FIG. 2).

The shift into a high gear of the transmission device is therefore very abrupt since all the rollers, both basic and special 18, participate in the gear shift. The set-up of the transmission device is therefore touring.

Figure 3:
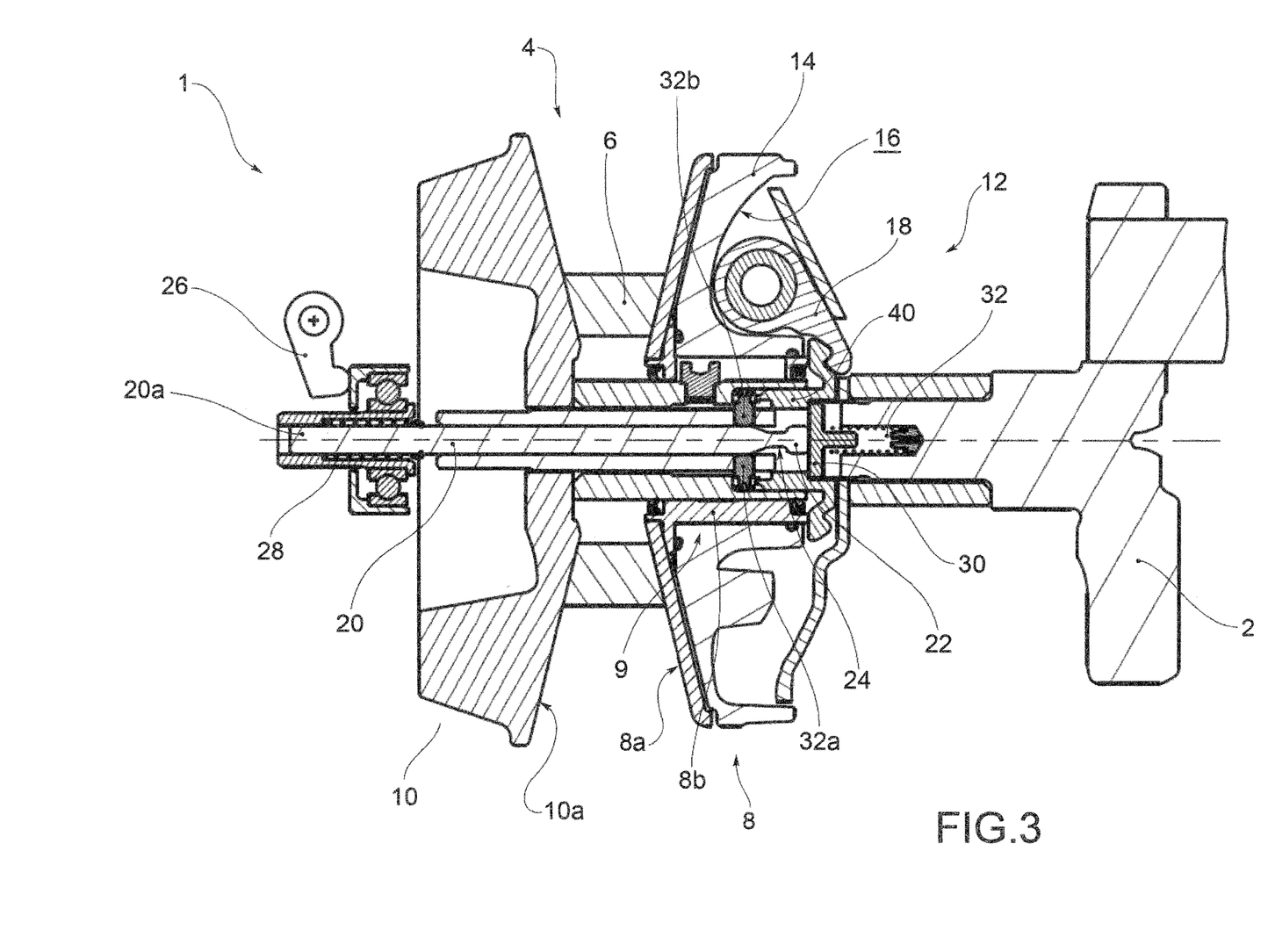
FIG. 3 shows the transmission device in FIG. 1, in a low gear configuration, with the regulation device activated and engaged.

Starting from the initial configuration as described above, to activate the gear shift regulation device, the control foot 26 is actuated, so that the actuation spring pushes the actuating rod 20 into a forward axial position, overcoming the contrary action of the return spring 32 (FIG. 3).

The keys 32*a*, 32*b* move into a forward radial position, coming out of the recess 24 and protruding outwardly from the drive shaft 2, since the slide 40, pushed by the mobile bushing 9, is in a forward limit position in which it does not prevent the exit of the keys 32*a*, 32*b*.

The special rollers 18 are in the rearward radial position and are engaged by the slide 40. In other words, the gripping edge 50 of the flange 48 of the slide 40 engages the engagement portion 54 of the stem 52 of the special rollers 18.

If starting from such configuration (regulation device activated and engaged), the regulation device is deactivated (eliminating the action of the control rod 20 of the control foot 26), the regulation device returns to the rest configuration (FIG. 1).

If, starting from the low gear condition of the transmission device, with the regulation device activated and engaged (FIG. 3), the engine revolutions increase, the basic rollers operate on the container 14 and the transmission device moves into the high gear condition (FIG. 4), but the special rollers 18 do not participate in this gear shift since held in the rearward position by the slide 40.

Figure 4:
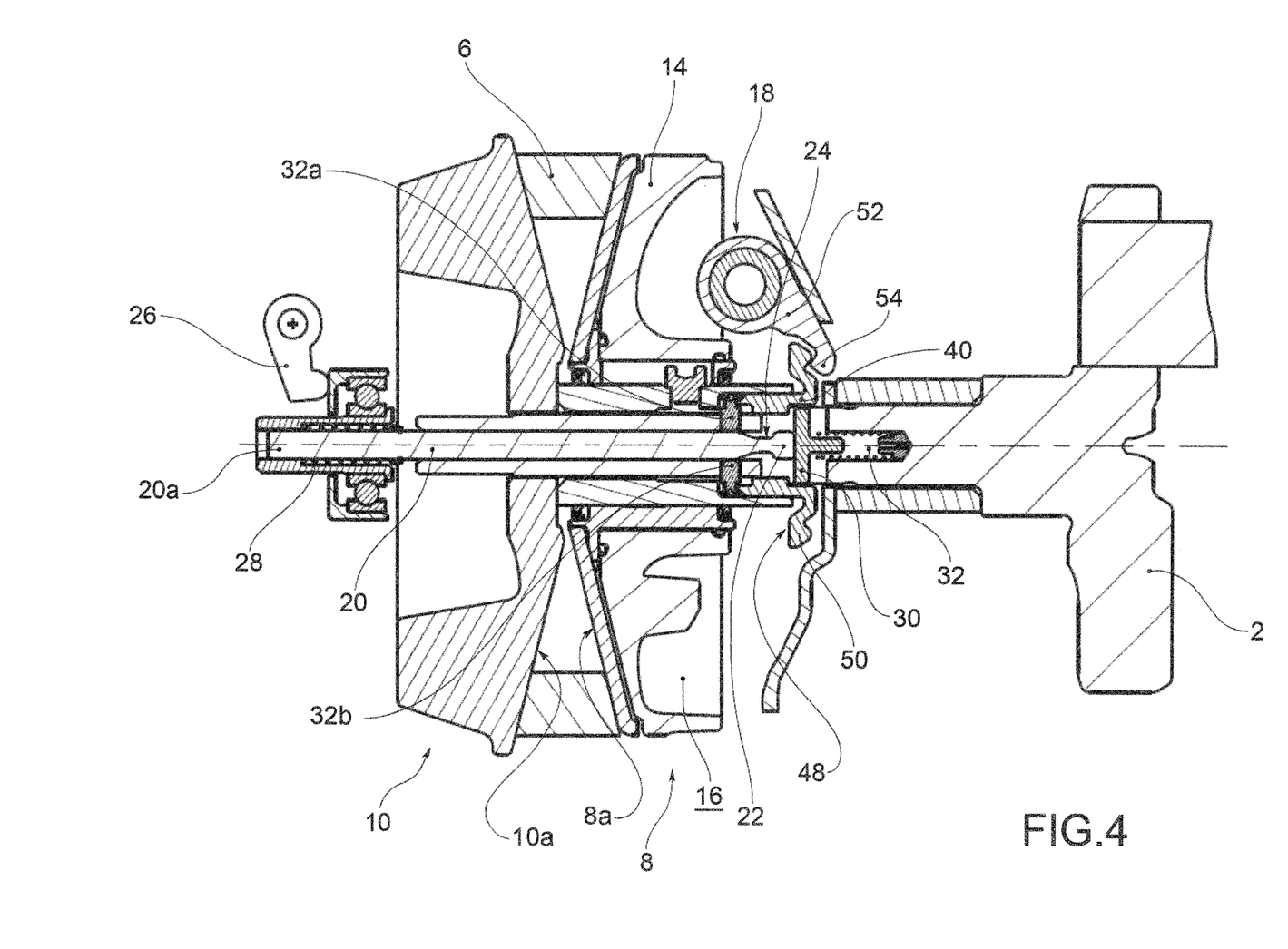
FIG. 4 shows the transmission device in FIG. 1, in a high gear configuration, with the regulation device activated and engaged.

The transition to a high gear is therefore slower than in the case in which all the rollers participate in the gear shift. The set-up of the transmission device is therefore more sporting.

In this configuration, the slide 40 is in a forward position thanks to the keys 32*a*, 32*b*, despite the mobile bushing 9 no longer forcing said slide 40 towards the forward limit position.

If in this configuration the regulation device is deactivated, this actually remains engaged, since the slider 40 is kept in the forward position by the keys 32*a*, 32*b* which remain in the forward radial position since the slide 40 constrains them to remain in such position (the locking end 44 of the slide 40 in fact engages the protrusion 36 of the keys 32*a*, 32*b*). The actuating rod 20 instead moves into the rearward position.

Only upon decreasing the engine revolutions does the mobile bushing 9 force the slide 40 back into the forward limit position, freeing the keys 32a, 32b which return to the rearward position in the recess 24 of the actuating pin 22.

The regulation device is thus no longer engaged; increasing the engine speed again the transmission device returns to the high gear condition, in a touring set-up (FIG. 2).

Figure 5:
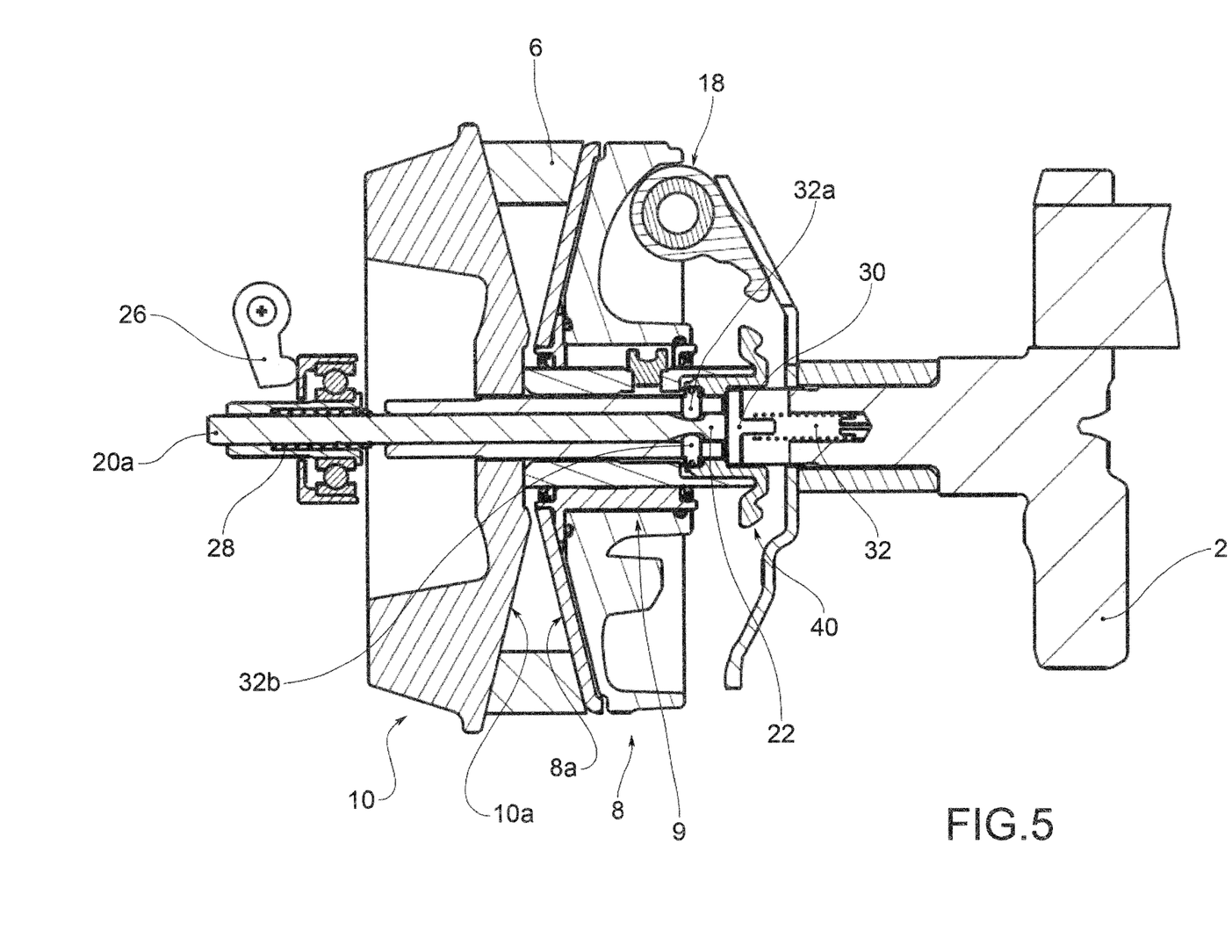
FIG. 5 shows the transmission device in FIG. 1, in a high gear configuration, with the regulation device activated and not engaged.

If, in the high gear condition of the transmission device, with the regulation device deactivated (FIG. 2), the regulation device is activated, said regulation device is active but not engaged, in the sense that the special rollers 18 remain released from the slide (FIG. 5).

In fact, by actuating the control foot 26, the actuation spring 28 pushes the actuating rod 20 and preloads, but the slide 40, under the action of the abutment element 30 and the abutment spring 32, not being subject to the action of the mobile bushing 9, is and remains in a rearward limit position, in which it axially surmounts the keys 32a, 32b and prevents them from moving from the rearward position to the forward position.

The actuating pin 22 does not therefore undergo any translation.

Only upon the decrease of the engine revolutions does the mobile bushing 9 force the slide 40 towards the forward limit position, thus releasing the keys 32a, 32b, which come out of the recess 24 and allow the pin 22 to move into the forward position under the action of the pre-loaded actuation spring 28.

The low gear condition of the transmission device is thus achieved, with the regulation device activated and engaged (FIG. 3).

Innovatively, the transmission device with gear shift regulation device makes it possible to activate the regulation device in any condition of the transmission device, i.e. a low gear or high gear, since the regulation device effectively engages the special rollers only in the low gear condition.

At the same time, advantageously, the deactivation of the regulation device can take place in any condition, since the effective release of the special rollers is realized only in a low gear condition, avoiding the impact due to sudden release during the gear shift.

It is clear that a person skilled in the art may make modifications to the transmission device described above so as to satisfy contingent requirements, all contained within the scope of protection as defined by the appended claims.

The invention claimed is:

1. A continuously variable transmission device for a two-, three- or four-wheel motorcycle, connectable to a drive shaft comprising:
a drive pulley for a V-belt, equipped with a mobile bushing carrying one of the active surfaces for the V-belt, a speed controller to obtain a gear shift between low gear and high gear, said speed controller comprising a container, supported by the mobile bushing and provided with a shaped seat, and a plurality of rollers housed in the seat,
the mobile bushing being slidable axially under the action of the rollers, said rollers being provided with an engagement device;
a gear shift regulation device, comprising a slide axially slidable and suitable to engage the rollers to hold them during the gear shift;
wherein the mobile bushing is suitable to influence the slide to cause its translation from a retracted position to an advanced limit position to engage the special rollers; and
wherein the slide comprises a tubular wall extending along a rotation axis between a lock end and a retention end.

2. A transmission device according to claim 1, wherein the gear shift regulation device comprises a locking device comprising at least one key radially translatable between a retracted radial position and an advanced radial position in which it prevents the slide from returning to the retracted position when not influenced by the mobile bushing.

3. A transmission device according to claim 2, wherein the regulation device comprises an actuating device comprising an actuating pin slidable axially between a retracted position and an advanced position, in order to influence the key and cause its translation from the retracted radial position to the advanced radial position.

4. A transmission device according to claim 3, wherein said key is engageable with the slide to prevent the return of the key in the retracted radial position when not influenced by the pin.

5. A transmission device according to claim 4, wherein said actuating device comprises an abutment element and an abutment spring, configured to permanently influence the slide from an advanced position towards the retracted position.

6. A transmission device according to claim 5, wherein the abutment element and the abutment spring are also configured to permanently influence the actuation pin from the advanced position to the retracted position.

7. A transmission device according to claim 5, wherein the slide, in the retracted position, prevents the exit of the key from the retracted position to the advanced position, thus blocking also the translation of the pin and allowing elastically loading an actuation spring acting on said pin to permanently influence it from the retracted position to the advanced position.

8. An assembly comprising:
a drive shaft, and
a continuously variable transmission device, comprising:
A) a drive pulley for a V-belt, equipped with a mobile bushing carrying one of the active surfaces for the V-belt, the mobile bushing being slidable axially under the action of a plurality of rollers provided with an engagement device, and with a speed controller to obtain a gear shift between low gear and high gear;
B) a gear shift regulation device, comprising a slide axially slidable and suitable to engage the rollers to hold them during the gear shift;
C) wherein the mobile bushing is suitable to influence the slide to cause its translation from a retracted position to an advanced limit position to engage the rollers;
wherein the drive shaft is connected integrally in rotation to the drive pulley, coaxially to this; and
wherein the slide comprises a tubular wall extending along a rotation axis between a lock end and a retention end.

9. A roller for a gear shift regulation device of a transmission device, comprising
a rolling body and engagement device suitable to be held by counter-engagement means of the gear shift regulation device, so as to realize a unilateral radial constraint, the roller being anchorable in a discriminable manner;
wherein the engagement device comprises a stem that extends away from the rolling body, said stem ending with an engagement portion suitable to engage with a gripping edge of a slide of the gear shift regulation device; and wherein the slide comprises a tubular wall extending along a rotation axis between a lock end and a retention end.

10. A roller according to claim 9, wherein the slide has an annular flange having a gripping edge configured to engage the rollers in a discriminable manner as a counter-engagement means, in order to prevent the rollers from moving entirely radially outwardly with respect to the drive shaft.

11. A roller according to claim 9, further comprising a stem extending away from the rolling body, ending with an engagement portion suitable to engage with the gripping edge of the slide so as to realize a unilateral radial constraint which prevents radial outward movement of the special roller.

12. A roller according to claim 9, wherein the rolling body, when not influenced by the gearshift regulation device, is designed to roll on a surface of a seat of a container of a speed controller.

\* \* \* \* \*